(12) United States Patent
Biyani et al.

(10) Patent No.: US 9,042,211 B2
(45) Date of Patent: May 26, 2015

(54) SYSTEMS AND METHODS OF RESOURCE ALLOCATION FOR CANCELLATION OF CROSSTALK

(75) Inventors: Pravesh Biyani, New Delhi (IN); Laurent Francis Alloin, Monmouth Beach, NJ (US); Shankar Prakriya, New Delhi (IN); Surendra Prasad, New Delhi (IN)

(73) Assignees: IKANOS COMMUNICATIONS, INC., FREMONT, CA (US); INDIAN INSTITUTE OF TECHNOLOGY DELHI DEPARTMENT OF ELECTRICAL ENGINEERING, New Delhi (IN)

( * ) Notice: Subject to any disclaimer, the term of this patent is extended or adjusted under 35 U.S.C. 154(b) by 668 days.

(21) Appl. No.: 12/969,332

(22) Filed: Dec. 15, 2010

(65) Prior Publication Data
US 2011/0150121 A1    Jun. 23, 2011

Related U.S. Application Data

(60) Provisional application No. 61/287,508, filed on Dec. 17, 2009, provisional application No. 61/320,042, filed on Apr. 1, 2010.

(51) Int. Cl.
*H04J 1/12* (2006.01)
*H04J 3/10* (2006.01)

(52) U.S. Cl.
CPC ........................................ *H04J 3/10* (2013.01)

(58) Field of Classification Search
CPC .............. H04J 3/10; H04J 1/12; H04B 3/464; H04Q 2011/0049
USPC ................................................. 370/201, 208
See application file for complete search history.

(56) References Cited

U.S. PATENT DOCUMENTS

| 6,144,696 | A  | * | 11/2000 | Shively et al. ................. 375/222 |
| 6,292,559 | B1 | * | 9/2001  | Gaikwad et al. ............... 379/417 |
| 7,720,167 | B2 | * | 5/2010  | Stopler ........................... 375/264 |
| 7,852,952 | B2 | * | 12/2010 | Rhee et al. ..................... 375/260 |

(Continued)

FOREIGN PATENT DOCUMENTS

| JP | 2005-184854 | 7/2005 |
| WO | WO2004/098088 | 11/2004 |

(Continued)

OTHER PUBLICATIONS

G. Ginis and J. Cioffi, Vectored Transmission for Digital Subscriber Line Systems:, IEEE JSAC, vol. 20, No. 5, Jun. 2002.

(Continued)

*Primary Examiner* — Steven H Nguyen
(74) *Attorney, Agent, or Firm* — Pillsbury Winthrop Shaw Pittman LLP (57) ABSTRACT

A method implemented in a multi-user communication system is described for performing far-end crosstalk (FEXT) cancellation for each victim user. The method comprises performing dynamic programming to allocate resources according to (N−1) normalized disturber coupling values and difference rate function values associated with N total users in the system involved in partial FEXT cancellation. In accordance with some embodiments, dynamic programming comprises selecting a tone and one or more disturbers to be cancelled for the tone.

20 Claims, 6 Drawing Sheets (56) References Cited

U.S. PATENT DOCUMENTS

| | | | | |
|---|---|---|---|---|
| 8,031,761 | B2* | 10/2011 | Cioffi et al. | 375/222 |
| 2006/0280237 | A1* | 12/2006 | Rhee et al. | 375/222 |
| 2009/0245340 | A1* | 10/2009 | Sorbara et al. | 375/227 |
| 2010/0220823 | A1* | 9/2010 | Biyani et al. | 375/346 |
| 2010/0278328 | A1* | 11/2010 | Mahadevan et al. | 379/406.06 |
| 2011/0026575 | A1* | 2/2011 | Shalom et al. | 375/227 |

FOREIGN PATENT DOCUMENTS

| | | |
|---|---|---|
| WO | WO 2006/131793 A2 | 12/2006 |
| WO | WO 2009/122410 A2 | 10/2009 |

OTHER PUBLICATIONS

R. Cendrillon, et al., "Partial Crosstalk Cancellation for Upstream VDSL", EURASIP Journal on Applied Signal Processing, vol. 10, pp. 1520-1535, 2004.

R. Cendrillon, et al., "Partial Crosstalk Precompensation in Downstream VDSL, Signal Processing", vol. 84, No. 11, pp. 2005-2019, 2004.

Amir R. Forouzan and Lee M. Garth, "Computationally Efficient Partial Crosstalk Cancellation in Fast Time-Varying DSL Crosstalk Environments", EURASIP Journal on Advances in Signal Processing, vol. 2007, Article ID 72041.

P. Tsiaflakis, et al., "Partial Crosstalk Cancellation in a Multi-User xDSL Environment", Proceedings if IEEE International Conference on Communications (ICC 06), vol. 7, pp. 32643269, Istanbul, Turkey, Jun. 2006.

A. Leshem and L. Youming, "A Low Complexity Coordinated FEXT Cancellation for VDSL", in Proceedings of the 11th IEEE International Conference on Electronics, Circuits and Systems (ICECS 04), pp. 338341, Tel Aviv, Israel, Dec. 2004.

R. Cendrillon, et al., "Low Complexity Crosstalk Cancellation Through Line Selection in Upstream VDSL", in Proceedings of IEEE International Conference on Acoustics, Speech and Signal Processing (ICASSP 03), vol. 4, pp. 692695, Hong Kong, Apr. 2003.

P. Duvaut, et al., "Adaptive Off Diagonal MIMO Canceller (ODMC) for VDSL Upstream Self-Fext Mitigation", Proceedings of EUSICPCO 2008, Laussane, Switzerland, Aug. 25-29, 2008).

P. Duvaut, et al., "Adaptive Off-Diagonal MIMO Precoder (ODMP) for Downstream DSL Self FEXT Cancellation".

ITU-T Recommendation G.996.1—Series G Transmission Systems and Media, Digital Systems and Networks—Digital transmission systems—Digital sections and digital line system—Access networks; Test procedures for digital subscriber line (DSL) transceivers (Jun. 1999).

ITU-T Recommendation G.993.2—Series G: Transmission Systems and Media, Digital Systems and Networks—Digital sections and digital line system—Access networks; Very high speed digital subscriber line transceivers 2 (VDSL2) (Feb. 2006).

European Search Report dated Sep. 27, 2011.

Ginis, George; "Vectored Transmission for Digital Subscriber Line Systems"; IEEE Journal on Selected Areas in Communications, IEEE Service Center, Piscataway, US, vol. 20, No. 5, Jun. 1, 2002.

Extended European Search Report dated Oct. 31, 2011.

\* cited by examiner

SYSTEMS AND METHODS OF RESOURCE ALLOCATION FOR CANCELLATION OF CROSSTALK

CROSS-REFERENCE TO RELATED APPLICATION

This application claims priority to, and the benefit of, U.S. Provisional patent application entitled, "Optimal Distribution of Complexity for Partial Cancellation in VDSL," having Ser. No. 61/287,508, filed on Dec. 17, 2009, and U.S. Provisional Patent Application entitled, "Optimal Distribution of Complexity for Partial Cancellation in VDSL," having Ser. No. 61/320,042, filed on Apr. 1, 2010, both of which are incorporated by reference in their entirety.

TECHNICAL FIELD

The present disclosure generally relates to communications systems and more particularly, relates to systems and methods for mitigating the effects of downstream and upstream far-end cross talk (FEXT) in a digital subscriber line (xDSL) system.

BACKGROUND

Digital subscriber line (xDSL) technology has developed in recent years in response to the demand for high-speed Internet access. xDSL technology utilizes the communication medium of pre-existing telephone systems. Thus, both plain old telephone systems (POTS) and xDSL systems share a common line for xDSL-compatible customer premises. Similarly, other services such as time compression multiplexing (TCM) integrated services digital network (ISDN) can also share a common line with xDSL and POTS.

In the field of telecommunications, the term crosstalk refers to interference that enters a message channel or disturbed channel from one or more other interfering channels (or disturbing channels) through a path coupling the interfering channels to the message channel. Crosstalk leads to reduced signal-to-noise ratio (SNR) that can create low audio quality in a voice system or reduced data rates and/or increased errors in a data system.

There are many types of crosstalk mechanisms on xDSL lines that are characterized, the two main types being far end crosstalk (FEXT) and near-end crosstalk (NEXT). FEXT refers to electromagnetic coupling that occurs when the receiver on a disturbed pair is located at the far end of the communication line relative to the transmitter of a disturbing pair. Self-FEXT generally refers to interference caused by neighboring lines provisioned for the same type of service as the affected line, although the neighboring lines and the affected line may be provisioned for different services as well. In contrast, NEXT results from a disturbing source connected at one end of the wire pair which causes interference in the message channel at the same end as the disturbing source.

Allocations of wire pairs within telephone cables in accordance with service requests have typically resulted in a random distribution of pair utilization with few precise records of actual configurations. Because of the physical proximity of different twisted pairs within a cable bundle (due to pair twisting, cable branching, cable splicing, etc.), crosstalk caused by the electromagnetic interference between the neighboring lines is often the dominating noise source in the transmission environment. In addition, due to pair twisting in cables where cable branching and splicing take place, a wire pair can be in close proximity to many different pairs spanning different portions of its length. At a telephone CO (central office), pairs in close proximity may carry diverse types of service using various modulation schemes, with considerable differences in signal levels (and receiver sensitivities) especially for pairs of considerably different lengths.

Both FEXT and self-FEXT continue to be a problem in xDSL communication systems as crosstalk impacts overall performance. Current approaches to addressing crosstalk suffer from various perceived shortcomings, such as increased design costs, high memory usage, and considerably increased need for computational resources along with their inefficient usage. Therefore, a heretofore unaddressed need exists in the industry to address the aforementioned deficiencies and inadequacies.

SUMMARY

One embodiment, among others, is a method implemented in a multi-user communication system for performing far-end crosstalk (FEXT) cancellation for each victim user. The method comprises calculating, for each victim user among all victim users, (N−1) normalized disturber coupling values across all tones in the system to undergo partial FEXT cancellation, wherein N is a total number of users in the system involved in partial FEXT cancellation. The method further comprises determining a signal-to-noise ratio (SNR) across all tones in the system to undergo partial FEXT cancellation, and sorting, for each tone, the (N−1) normalized disturber coupling values. The method further comprises calculating (N−1) SNR function values for every tone and calculating (N−1) rate difference function values for every tone. Based on the sorted (N−1) normalized disturber coupling values and difference rate function values, resource allocation is performed according to a dynamic programming approach, wherein the dynamic programming approach comprises recursively selecting one or more of: a disturber and a tone.

Another embodiment is a system for performing far-end crosstalk (FEXT) cancellation. The system comprises a selection module configured to sort (N−1) normalized disturber coupling values and difference rate function values associated with N total users in the system involved in partial FEXT cancellation. The selection module comprises a resource allocator configured to perform dynamic programming to incrementally allocate resources by selecting, for each step of the dynamic programming performed by the resource allocator, one or more of: a disturber and a tone.

Another embodiment is a method implemented in a multi-user communication system for performing far-end crosstalk (FEXT) cancellation for each user. The method comprises performing dynamic programming to allocate resources according to (N−1) normalized disturber coupling values and difference rate function values associated with N total users in the system involved in partial FEXT cancellation, wherein dynamic programming comprises selecting a tone and one or more disturbers to be cancelled for the tone.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

In order to adjust for performance variations over the entire available spectrum, digital subscriber line (xDSL) systems typically use discrete multi-tone (DMT) techniques (e.g., a multi-carrier technique) that divide the available bandwidth of twisted-pair copper lines into multiple channels or bins. Through the use of DMT, the available bandwidth is broken into a plurality of sub-channels or tones and data is simultaneously transferred over several of the sub-channels depending upon the transmission characteristics of each sub-channel. For example, in conventional xDSL systems such as ADSL, the copper transmission line is divided into 256 DMT tones or sub-channels, with consecutive sub-channels having a center frequency separated by 4.3125 kHz.

With DMT systems, a plurality of frames of a data stream is broken down into data blocks. Each data block is allocated to multiple sub-channels. The signal on a sub-channel, in turn, can be represented as a complex value modulating a carrier whose frequency is the same as the center frequency of the sub-channel. The magnitude and phase of the complex value is based on the data that the sub-channel is carrying and on the amount of bits that the sub-channel can support, sometimes referred to as bit-loading. The bit-loading on a given sub-channel is indicative of the number of constellation points (e.g., the number of magnitude and phase combinations of the complex value) that can be transmitted on the sub-channel. Thus, if the bit-loading of a particular carrier channel is 2, then the number of constellation points is 4, with a constellation point in each quadrant representing the binary number 00, 01, 10, or 11, for example. This process of associating binary numbers to constellation points is sometimes referred to as constellation encoding or constellation mapping.

Each sub-channel typically carries between 1 to 15 bits of data that are mapped on the constellation points of an appropriately sized quadrature amplitude modulation (QAM) constellation. The signals of the plurality of sub-channels are then summed to produce a time domain DMT symbol that is subsequently transmitted over the twisted-pair copper line. That is, each of the carriers that make up the DMT symbol contains a QAM signal. A DMT symbol is generated for each frame of the original data stream. This results essentially in overall performance which is equivalent to around two hundred V.34 modems used in parallel on the same line. Because each carrier channel can be configured to a different bit rate according to the channel characteristics, it can be seen that DMT is inherently rate-adaptive and extremely flexible for interfacing with different subscriber equipment and line conditions.

Figure 1A:
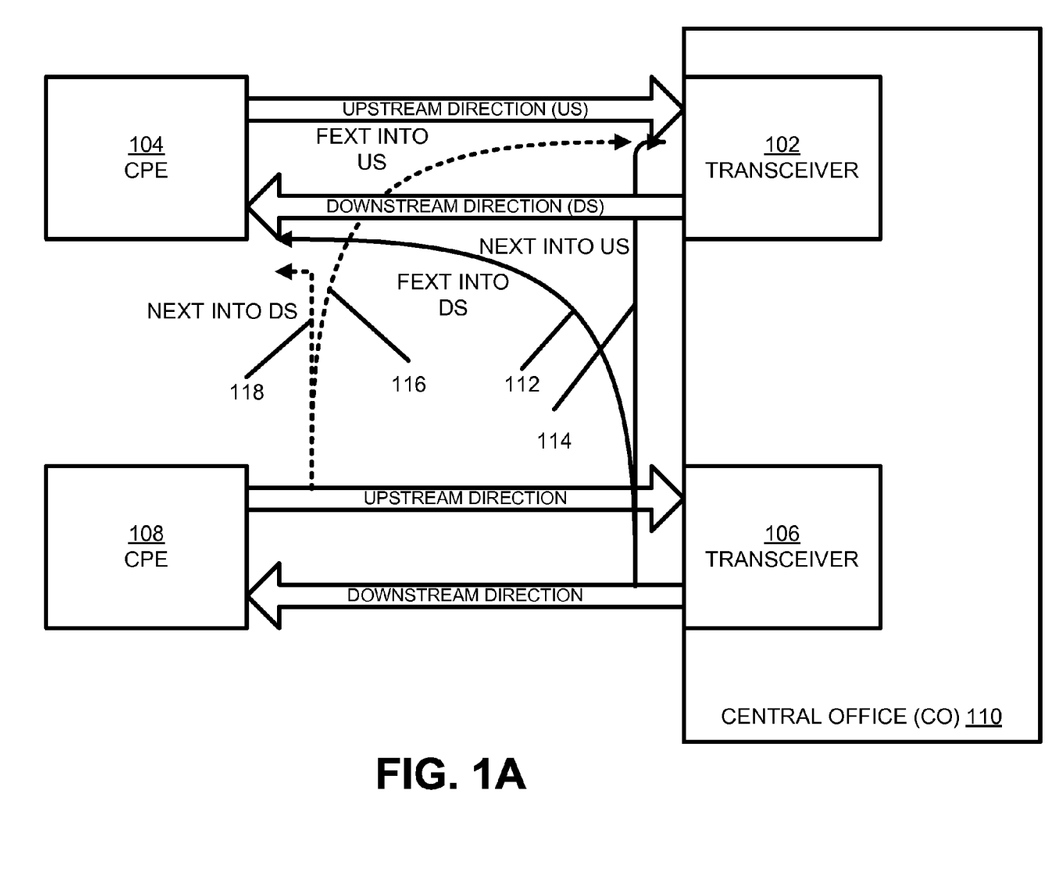
FIG. 1A illustrates the various types of crosstalk typically experienced in a DSL system.

Reference is made to FIG. 1, which illustrates the various types of crosstalk typically experienced in a digital subscriber line (xDSL) system. For purposes of illustration, the central office (CO) 110 comprises two transceivers 102, 106 communicating over two subscriber lines to two sets of customer premises equipment (CPE) 104, 108 (N=2). Transceiver 102 communicates with CPE 104, and transceiver 106 communicates with CPE 108. To illustrate, the crosstalk from CO transceiver 106 and CPE 108 to either CO transceiver 102 or CPE 104 is described. However, it should be understood that interference may also be between the transmitter and receiver on the same subscriber line in both the upstream and downstream paths, which is the near-end echo of the transmit signal.

The term far-end refers to scenarios in which the source of interference is away from the receiving side, and the term near-end refers to scenarios in which the source of interference is close to the receiving side. For example, interference shown by arrow 112 illustrates noise generated by transceiver 106 coupled into the downstream communications and received by CPE 104. The term victim refers to the line or the circuit experiencing crosstalk, and the term disturber describes the source of the crosstalk. Since the noise is generated away from the receiving side, this is referred to as downstream far-end crosstalk (FEXT). Likewise, interference shown by arrow 114 illustrates upstream near-end crosstalk (NEXT). Interference shown by arrow 116 illustrates upstream FEXT, and interference shown by arrow 118 illustrates downstream NEXT. In particular, FEXT is a ubiquitous source of noise in (very high bitrate DSL) VDSL. Accordingly, various needs exist in the industry to address the aforementioned deficiencies and inadequacies, such as mitigating FEXT.

VDSL is becoming more commonly utilized as the last mile solution for high speed data communications. The data rate for VDSL, however, may be impaired by many different sources of disturbance, including self-induced crosstalk, impulse noise, alien noise, among other sources. Dynamic spectrum management level 3 (DSM3) is one approach to mitigating or cancelling the effects of self-FEXT. To cancel the effects of self-FEXT, DSM3 compliant devices generally utilize a technique known as signal cooperation or signal vectoring at the central office (CO) that employs processing on a per-frequency or per-tone basis in order to mitigate self-FEXT in both the upstream and downstream directions. In the upstream direction, signal vectoring may take advantage of simultaneous access to the received signals of all vectored users at the CO to also effectively mitigate alien crosstalk.

The capability of performing signal cooperation at the CO makes crosstalk cancellation suitable for implementing per-frequency FEXT mitigation processing in both directions at the CO. This approach, however, generally requires significant computational resources at the CO. Practical FEXT mitigation schemes in vectored VDSL systems therefore generally operate with some degree of computational and/or storage constraints at the CO. In particular, a limit is placed on the number of frequency tones or sub-channels on which FEXT mitigation is performed and the number of disturbers to be cancelled in all the sub-channels or tones. Note that for some embodiments, all the tones may be selected for FEXT cancellation, but restrictions may be placed on the total disturbers in each tone to be cancelled. A combination of the two strategies described above can also be utilized. Under such scenarios, it is advantageous to systematically and optimally select tones and disturbers for partial FEXT mitigation in order to achieve maximum performance with the limited computational resources available at the CO.

In certain situations, it may be possible to perform signal cooperation and FEXT mitigation at the CPE side in addition to the CO side. An example is a multi-pair bonded xDSL system where a CPE is connected to the CO through two or more twisted pairs. When signal cooperation is possible at both the CO and CPE sides, FEXT mitigation for a given direction may be performed at either end. For example, both downstream and upstream FEXT mitigation may be performed at the CO side, or both downstream and upstream FEXT mitigation may be performed at the CPE side. Further, downstream FEXT mitigation may be performed at the CPE side while upstream FEXT mitigation may be performed at the CO side. In yet other embodiments, downstream FEXT mitigation may be performed at the CO side while upstream FEXT mitigation may be performed at the CPE side. When signal cooperation and FEXT mitigation for any direction is carried out at the CPE side, the limitations on the computational resources for performing FEXT mitigation are likely to be even more severe. It is thus advantageous to systematically and optimally select tones and disturbers for FEXT mitigation in order to achieve maximum performance with the limited computational resources available.

The limited resources available to perform crosstalk cancellation is further illustrated by the following statistics on the required degree of complexity involved from a resource standpoint. Assume, for purposes of illustration, that the total number of tones used in a given VDSL system is on the order of (K=1000), and assume that there are (N=10) vectored users. Based on these figures, approximately ($N^2$) runtime complex multiplications per DMT symbol are needed to perform full FEXT cancellation. Therefore, for a total of K tones, approximately $KN^2$ multiplications are required to process every DMT symbol. Thus, for a sampling frequency on the order of $10^3$, this equates to upwards of a billion flops (floating point operations per second) that are required to completely cancel crosstalk for all the users, which is computationally infeasible with current processor technology.

Various embodiments are thus described for performing partial cancellation based on selective cancellation of disturber crosstalk in order to fit within the limited computational resources and/or power resources available within a system. For example, partial cancellation may be performed to fit within predetermined power consumption requirements at the CO. Typically, a majority of the crosstalk experienced in a system originates from only a portion of all the disturbers present. Thus, cancelling all the crosstalk (i.e., performing full FEXT cancellation) results only in marginal gains and generally does not outweigh the cost in computational resources needed to accomplish full FEXT cancellation. As such, various embodiments incorporate an efficient partial FEXT cancellation technique, whereby systems and methods for meeting the constraints defined by the limited computational resources in a system are described followed by a system in which the allocated resources may be implemented. Specifically, embodiments are described for allocating different vectored users for FEXT cancellation whereby a weighted rate of the vectored users is maximized. Note that other rate functions of users may be utilized as well. The computational resources available at the central office (CO) are identified and distributed or allocated among the various vectored users by solving a multi-user weighted rate maximization problem under the additional constraint of minimum rate requirements for each of the users.

The primary incentive for performing partial cancellation is to achieve optimal crosstalk cancellation on a greater number of users, given a limited computational resource available for performing this task. With fewer resources, higher performance can be achieved, or for the same number of resources, a greater number of users with minimum performance can be satisfied. Another incentive for partial cancellation may be to reduce power consumption at the CO. Since a more efficient allocation of computational resources results in a more optimum cancellation scheme, less computational resources are needed, which may in all practicality, lead to less power consumption of the canceller unit located at the central office (CO). Note that the power is dissipated whenever a crosstalk cancellation of a given disturber in a victim is performed.

Thus, alternatively, the proposed partial cancellation scheme can be constrained by a given power consumption constraint, which translates indirectly into a certain number of computational resources being available. That is, a computational resource constraint for the optimization problem can be translated into a power consumption constraint. Power consumption may be of particular importance for a large scale vectoring entity, since it is expected to grow with the square of the number of disturbers and/or victims involved in a full FEXT cancellation scheme. By optimally allocating resources in a partial cancellation scheme, the objective is to achieve a linear increase in the power consumption with respect to the number of disturbers and/or victims.

Conventional approaches to performing resource allocation for partial FEXT cancellation focus primarily on solving single-user complexity distribution problems and do not sufficiently address the multi-user scenario. Such techniques as line selection, tone selection, and joint line tone selection mainly maximize the total data rate of one vectored user according to the fixed computational resources allocated to the user. However, one perceived shortcoming with such approaches is that a CO-centric multi-user complexity allocation technique has not been sufficiently addressed by such conventional approaches. Furthermore, various conventional approaches concentrate on a continuous approach for solving a problem which in reality, tends to be discrete in nature from the standpoint of computational resources (i.e., the number of cancellation taps to be used). Specifically, computational resources are utilized or allocated according to integer values. For example, 1, 2, or 3 disturbers can be cancelled, but it is not possible to cancel 1.5 disturbers. As a result, solutions derived following a continuous approach can be further improved taking into account the discrete nature of the allocation problem.

Moreover, while continuous approaches may lead to approximately an optimal solution, such resources require enormous computational resources to implement, thereby defeating some of the motivation for performing partial cancellation. Finally, such approaches also do not work for a wide variety of optimization criterion, while the partial cancellation allocation scheme described herein lends itself more easily to various optimization criteria. Several optimization strategies may work only when the approach is in accord with the real nature of the underlying problem. Another important advantage of following a discrete approach, as described herein in connection with various embodiments, is the flexibility that a discrete approach allows when parameters change in the system, such as, but not limited to, the addition of new users and another users being removed from the system.

As the focus of DSM3 processing is at the CO, it is important to consider how to allocate computational resources to each of the vectored users by the CO in order to maximize their data rates. One conventional approach to performing partial FEXT cancellation resource allocation is a lagrangian-based multi-user complexity allocation technique. However, the lagrangian-based multi-user technique experiences the same perceived shortcoming described earlier as this technique is computationally expensive and exceeds the processing capabilities of many systems.

To illustrate, a lagrangian multiplier requires nearly 50 iterations in order to converge towards an optimal solution. Thus, each iteration in the lagrangian-based approach requires $O(KN^2)$ complex multiplications per DMT symbol. A need therefore exists for a faster complexity allocation solution that is also compatible with the processing capabilities available in a given system. Note that this need exists as the number of users in the system tends to be dynamic in nature, with new users periodically being added and existing users being removed. Such a scenario is likely to happen in practice in a large scale vectoring system, whenever new DSL users join or leave the vectoring system. In each of those instances, a reallocation of resources may be needed to reach a new optimal solution given the new configuration of users and disturbers. A rapid and efficient reallocation of the computational resources across the vectored users is paramount to achieving the allocation benefits. One result in implementing the embodiments described herein is a large reduction in the number of iterations needed to allocate computational resources to the vectored users.

Various embodiments described herein are directed to a multi-user complexity allocation scheme that is based on certain observations and properties of vectored VDSL systems. The disclosed embodiments are based on the following aspects. A first aspect involves optimal allocation of computational resources from a single-user point of view. That is, given a limited number of computational resources, a determination is made for a given vectored user which disturbers to cancel at any given tone in order to maximize that user's rate. A second aspect is directed to extending the first aspect (the single-user scenario) to the multi-user scenario and determining the optimum allocation of computational resources to each user to maximize the sum of weighted rate of the various users. One application for the weighted rate approach relates to the desire to optimize the overall capacity of the bundle. The weights are taken to be unity in this case, and the sum of the rates represents the total rate of the bundle. For some embodiments, the weights assigned to various vectored users may be determined a priori based on various factors, including but not limited to, the rate requirements of a particular user and the amount charged by the telephone company to a particular user. The described embodiments provide a faster and more efficient approach to performing partial FEXT cancellation. It should also be noted that the embodiments provide a simple solution when new users are added to the system.

Apart from using weighted rate maximization as an optimization criterion, multi-user resource allocation can also be performed to satisfy requirements imposed by various service operators in a practical setting. In another embodiment of the resource allocation, the offerings of these operators is optimized by maximizing the number of users in the given rate services. For example, with reference to FIG. 1B, each rate service may signify the minimum and the maximum rate that should be achieved by the user to satisfy a certain type of service, such as a 50 Mbps service for high-end video and data service, a 30 MBps service for regular video and data service, and a 10 Mbps service for data only service, assuming in this example that there are only three such service offerings by the operator. Practically, the reach of these individual service offerings is determined by the expected upstream and downstream rates achieved up until a certain distance and under a certain alien and self-FEXT noise environment.

Figure 1B:
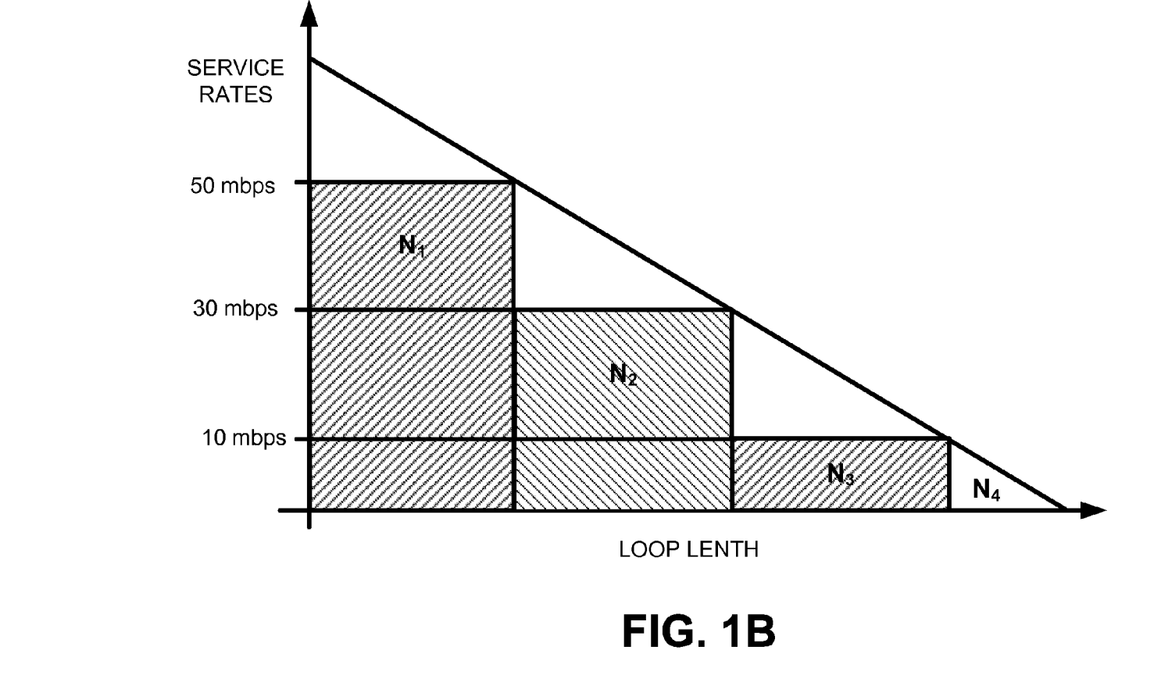
FIG. 1B illustrates how each rate service may signify the minimum and the maximum rate that should be achieved by the user to satisfy a certain type of service.

Typically, the objective of the operator would be to extend the reach of these service offerings in order to maximize the number of users for each of the high end services. This is illustrated in FIG. 1B in which three sets of users N1, N2, N3 are expected in a non cancelled FEXT environment to be served with three respective service offerings. The problem under consideration is how to extend a priori the number in those 3 categories by performing an optimum allocation of self-FEXT cancellation resource, in order to define actual service reach. The utility function to maximize would, for example, be based on maximizing the number of users N1, N2 and N3 for the higher end services expected to provide higher return for the operator. Suppose the operator receives a return of R1, R2 and R3 dollars when the users join the three services. In mathematical terms, the operators would like to maximize the following utility function.

$$\max R1*N1+R2*N2+R3*N3$$

This problem can be easily solved by first finding the resources required for each of the users to reach services 1, 2 and 3. This can be done by solving N single user resource allocation problems. Then by solving a linear programming problem given in above, one can maximize the operator return. Note that the problem formulation above is just one embodiment of the maximization problem and is only one way of formulating the operator return strategy. The equation above essentially signifies a linear multi-user optimization problem, There may be other manifestations of the problem above, one of which is the multi-user resource allocation problem, the solution of which is described herein. The weights of the multi-user resource allocation problem can be derived based on the gains achieved for the operator on switching the given user to various services. Note that the weights vary as users are placed in different rate zones or services. In order to maximize the number of vectored users according to different services, the weights associated with different users are therefore dynamically adjusted.

In other embodiments, the minimum rate constraints of all the users in the first service is first satisfied. The minimum rate requirements of the second service and subsequently the third service are then satisfied. In accordance to other embodiments, the utility function to maximize would be related to the prorated return that operators would achieve by increasing the number of users in each service category. As will become apparent, the use of a discrete solution structure automatically ensures that operator requirements are satisfied in an optimal fashion.

Embodiments for performing partial FEXT cancellation scheme are directed to selecting tones and disturbers within these selected tones to undergo FEXT cancellation and may be implemented for both the upstream (US) and downstream (DS) directions. Generally, the single-user framework comprises a pre-allocation phase and a resource allocation phase before the actual FEXT cancellation phase takes place. As described earlier, the multi-user framework is an extension of the single-user framework, hence the pre-processing of the single-user framework can also be extended for the multi-user framework with appropriate changes.

The pre-allocation phase begins by calculating the value of the (N−1) FEXT disturber couplings for each victim user across all the tones undergoing partial FEXT cancellation, where N is the total number of users involved in partial FEXT cancellation. Note that here, up to (N−1) disturbers can be identified per victim user, and there can be as many as N victim users. In this regard, up to N victim users can undergo partial FEXT cancellation. Note also that there are various ways to calculate FEXT disturber couplings. One possible way is to determine the FEXT couplings by performing a cross-correlation of the signal received on a victim user with the actual disturber transmit signal using a known transmit sequence. An alternative way is by directly training a FEXT canceller by minimizing the impact of the disturber signal onto the victim user, using a known transmit sequence. The FEXT canceller coefficients obtained through this process inherently represents the reciprocal of the FEXT disturber couplings which are sought. Any of these two ways yields the desired FEXT disturber couplings into the victim user. Then, prior to performing any FEXT cancellation, the signal-to-noise ratio (SNR) and bit loading for each tone of the victim user undergoing partial FEXT cancellation is determined. Furthermore, the total bit rate function is calculated (also prior to performing FEXT cancellation for the current user).

Since the transmit symbol energies of all the vectored users across every tone is also known at the CO end, the couplings of each of the disturbers are then normalized with respect to the average transmit energy of the disturber and the victim. Hence, for every tone, the (N−1) normalized FEXT couplings can be sorted from the highest to the lowest values with respect to magnitude. Also, for every tone, the (N−1) SNR function values and bit loading corresponding to the removal of the normalized coupling is determined and sorted in decreasing order of magnitude. For some embodiments, this is done by removing the largest normalized coupling component one at a time and calculating the SNR function with the remaining normalized crosstalk coupling, thereby providing a bit loading function. For some embodiments, the SNR function is also calculated after performing FEXT cancellation of the disturber with the largest normalized coupling on every tone. Note that the removal of the largest normalized coupling component and/or the determination of the SNR function after FEXT cancellation are performed (N−1) times, which corresponds to the (N−1) disturbers across every tone for each user. For some implementations, the SNR function values are stored in a matrix of dimension (K)×(N−1) (where K is the total number of tones) in a tangible storage medium, such as the storage mediums described later. The rate difference function is the incremental rate gained on cancelling the dominant disturbers in the decreasing order on every tone and evaluated according to the SNR function values. In alternative embodiments, other function values, including but not limited to, SNR difference function values themselves may also be used.

Prior to performing partial FEXT cancellation, the computational resources available in the system are determined for performing FEXT cancellation for a given user. This provides the motivation for performing the partial FEXT cancellation (versus full FEXT cancellation) and affects how many FEXT disturbers will be selected to undergo cancellation. For some embodiments, the number of computational resources may be specified a priori by the CO, while for other embodiments, the computational resources available may be defined based on minimum bit-rate requirements. For example, if the bit rate requirement for a given user is satisfied while performing partial FEXT cancellation, then the partial FEXT cancellation allocation process may be stopped since minimum performance requirements are met. In accordance with such embodiments, the net gain in bit rate is calculated. If the minimum bit-rate requirement is still not met, more disturbers are selected to undergo FEXT cancellation until the minimum bit-rate requirement is met. To this end, an algorithm based on dynamic programming is used where resource allocation is incrementally performed by choosing the set of disturbers to cancel. Dynamic programming generally refers to the approach of solving complex problems by breaking the problems down into simpler and smaller sub-problems. If the sub-problems can be nested recursively inside larger problems so that dynamic programming methods are applicable, there is a relation between the value of the larger problem and the values of the sub-problems. This is known as the optimal substructure property of dynamic programming. Since the multi-user resource allocation problem satisfies the substructure property above, the dynamic programming approach can be applied in many ways to solve the problem.

For example, using a dynamic programming approach, one tone, along with a number of disturbers that should be optimally cancelled on that tone, is selected at each step. This is done recursively until the total resources are completely utilized. In accordance with various embodiments, up to (N−1) disturbers that maximize rate gain are selected per tone (based on a total of N users involved in partial FEXT cancellation). For some embodiments, the selection of tones (out of total set of K tones) and the number of disturbers is performed by sorting each column of the (K)×(N−1) SNR difference function matrix described earlier. Since every step decides an optimal tone and associated number of disturbers, the total number of computational resources needed is decreased by the number of disturbers in the selected optimal tone.

During the process of performing partial FEXT cancellation, if the total number of computational resources is exhausted, then the resource allocation is stopped in order to not exceed the computational resources that are available. Note that there are several ways of implementing a dynamic programming method, and the various embodiments described may be implemented using other dynamic programming approaches as well. For example, in one embodiment directed to using dynamic programming for resource allocation, one resource and one tone could be added at each step (rather than adding one resource to all the tones). In short, any approach that builds on the optimal sub structure discussed above will generally involve dynamic programming.

Having described the basic framework for partial FEXT cancellation, additional details are now provided for the various operations described above. First, a system model in which embodiments of a partial FEXT cancellation scheme is described, followed by a discussion of the problem and a solution involving the multi-user weighted rate optimization based on an extension of a single-user optimization scheme. Finally, a comparison is made between the partial FEXT cancellation scheme described herein and a conventional approach (i.e., the lagrangian-based approach discussed earlier) in order to illustrate the efficiency of the described embodiments.

Figure 2:
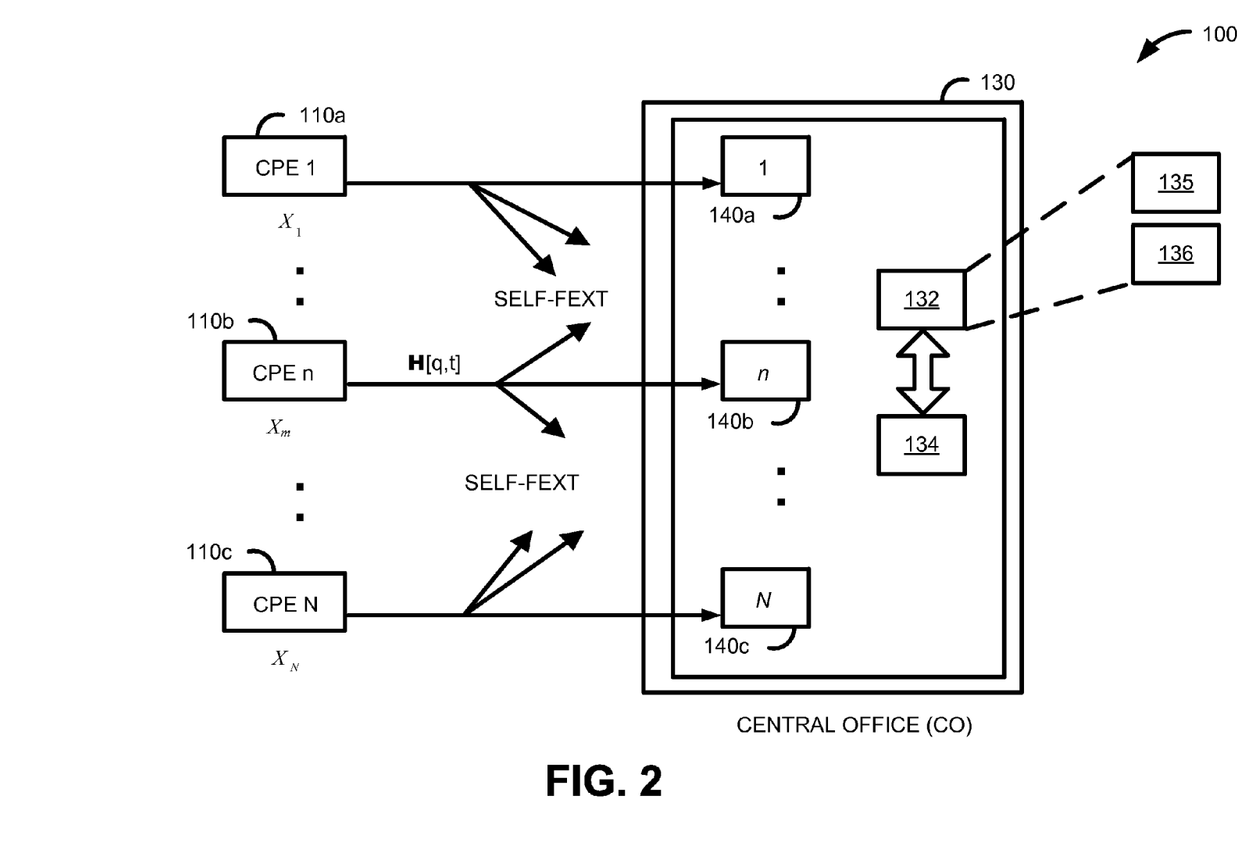
FIG. 2 illustrates a system in which embodiments for performing partial FEXT cancellation may be implemented.

Reference is made to FIG. 2, which illustrates a system 100 in which embodiments for performing partial FEXT cancellation may be implemented. In accordance with some embodiments, the system may comprise a DMT-based xDSL system. The system includes N sets of CPE (customer premises equipment) or users 110a, 110b, 110c, where each user 110a, 110b, 110c is referenced by index n, and where N represents the total number of users involved in partial FEXT cancellation. The system 100 further comprises a selection module 132, which performs tone and disturber selection for FEXT cancellation, as described in more detail below.

In general, and irrespective of whether signal cooperation and FEXT mitigation is performed at the CO or CPE, the selection module 132 for a given direction of operation (e.g., upstream vs. downstream) can be implemented either at the CO or the CPE. For embodiments where the selection module 132 for both directions is implemented within the CO (CO-centric tone-selection), a protocol established between the CO and each CPE may be used to provide transport of information from the various CPEs (or end users) back to the CO in order to perform tone/disturber selection at the CO for downstream FEXT mitigation. For upstream FEXT mitigation in a CO-centric tone-selection implementation, the information used for tone selection already resides at the CO. For other embodiments, the selection module 132 for both directions may be implemented within the CPE 110a, 110b, 110c (CPE-centric tone-selection). For such embodiments, a protocol is incorporated to provide transport of information from the CO to the CPE in order to allow the CPE to satisfactorily perform tone selection for upstream FEXT mitigation. For downstream FEXT mitigation in a CPE-centric tone-selection case, the information used for tone-selection already resides on the CPE.

The system 100 further comprises a FEXT canceller 134 which performs FEXT cancellation based on the selections made by the selection module 132. In accordance with some embodiments, the FEXT canceller 134 may comprise a MIMO (multiple-input multiple-output) precoder for FEXT associated with the downstream direction. For the upstream direction, the FEXT canceller 134 may comprise a MIMO canceller. In accordance with such embodiments, the FEXT canceller 134 may be further configured to address noise from external sources. The CO 130 may also include an xDSL access multiplexer (DSLAM), CO transceivers 140a, 140b, 140c, and other equipment for interfacing with users 110a, 110b, 110c. In some embodiments, the CO transceivers cards 140a, 140b, 140c may interface with the selection module 132. Furthermore, for any given direction of operation, if the FEXT canceller 134 and selection module 132 for that direction are located at different ends (i.e., one of the modules is at the CO while the other is at the CPE), another protocol may have to be incorporated between the CO and CPE to transport information of the tones selected by the selection module 132 to the FEXT canceller 134. The selection module 132 further comprises a sorting module 135 configured to sort, for each of the tones present, (N−1) disturber coupling values in descending order with respect to magnitude of the disturber coupling values. The selection module 132 also comprises a resource allocator 136 configured to determine the computational resources available at the CO 130 for performing FEXT cancellation.

Figure 3:
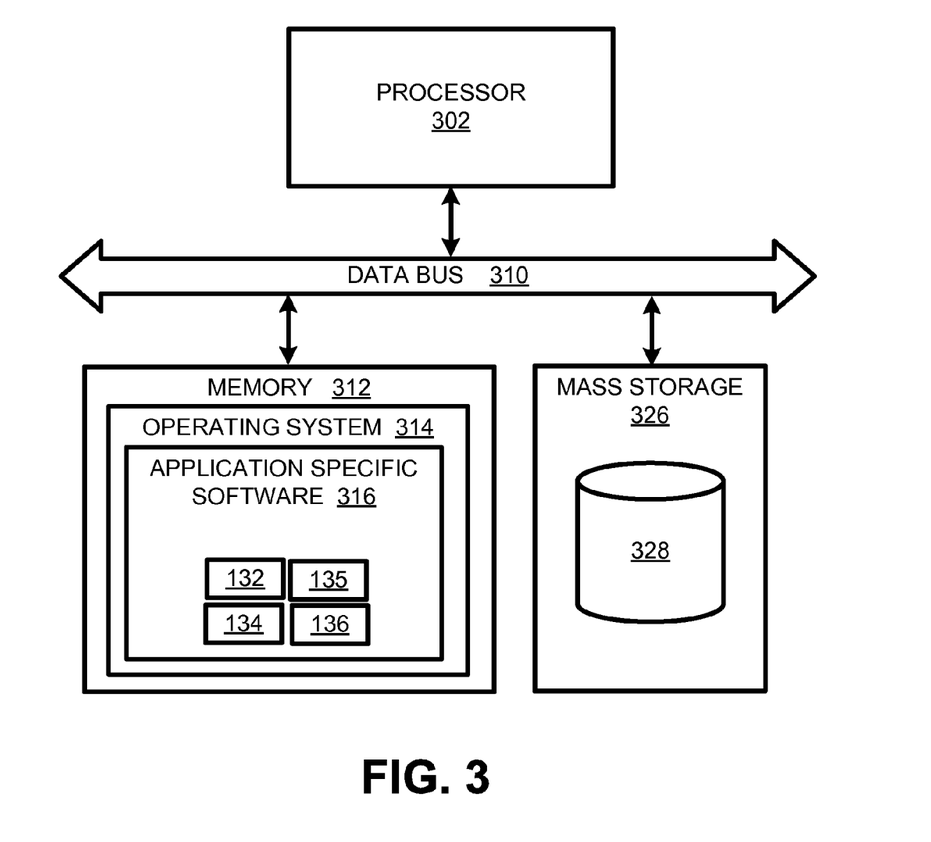
FIG. 3 illustrates an embodiment of an apparatus within the central office for implementing the various components shown in FIG. 2.

Reference is now made to FIG. 3, which illustrates an embodiment of an apparatus within the CO 130 for implementing the various components shown in FIG. 2. Generally speaking, the apparatus may comprise any one of a number of computing devices. Irrespective of its specific arrangement, the apparatus may comprise memory 312, a processor 302, and mass storage 326, wherein each of these devices are connected across a data bus 310.

The processor 302 may include any custom made or commercially available processor, a central processing unit (CPU) or an auxiliary processor among several processors associated with the apparatus, a semiconductor based microprocessor (in the form of a microchip), one or more application specific integrated circuits (ASICs), a plurality of suitably configured digital logic gates, and other well known electrical configurations comprising discrete elements both individually and in various combinations to coordinate the overall operation of the computing system.

The memory 312 can include any one or a combination of volatile memory elements (e.g., random-access memory (RAM, such as DRAM, and SRAM, etc.)) and nonvolatile memory elements (e.g., ROM, hard drive, CDROM, etc.). The memory 312 typically comprises a native operating system 314, one or more native applications, emulation systems, or emulated applications for any of a variety of operating systems and/or emulated hardware platforms, emulated operating systems, etc. For example, the applications may include application specific software 316 stored on a non-transitory computer readable medium for execution by the processor 302 and may include any of the modules 132, 134, 135, 136 described in connection with FIG. 2. One of ordinary skill in the art will appreciate that the memory 312 can, and typically will, comprise other components which have been omitted for purposes of brevity. It should be noted, however, that the modules 132, 134, 135, 136 may also be embodied as hardware.

Where any of the components described above comprises software or code, the same can be embodied in any computer-readable medium for use by or in connection with an instruction execution system such as, for example, a processor in a computer system or other system. In the context of the present disclosure, a computer-readable medium can be any tangible medium that can contain, store, or maintain the software or code for use by or in connection with an instruction execution system. For example, a computer-readable medium may store one or more programs for execution by the processing device 302 described above. The computer readable medium can be, for example, but not limited to, an electronic, magnetic, optical, electromagnetic, infrared, or semiconductor system, apparatus, or device.

More specific examples of the computer-readable medium may include an electrical connection having one or more wires, a portable computer diskette, a random access memory (RAM), a read-only memory (ROM), an erasable programmable read-only memory (EPROM, EEPROM, or Flash memory), and a portable compact disc read-only memory (CDROM). As shown in FIG. 3, the apparatus may further comprise mass storage 326. For some embodiments, the mass storage 326 may include a database 328 for storing and managing data, such as the matrices described below.

Referring back to FIG. 2, VDSL systems use a DMT-based transmission scheme thereby ensuring tone-wise independence of transmission and reception. Thus, tone-wise crosstalk cancellation is performed. For purposes of this disclosure, at tone q, the system 100 is modeled as:

$$y[q]=H[q] \times x[q]+v[q] \quad q \in \{1, \ldots K\} \quad (1)$$

where, N is the number of vectored users, H[q] is the N×N MIMO-DSL channel matrix whose elements H(n,m)[q] are crosstalk couplings from the disturber n to victim m, x[q]= $[x_1[q] \ldots x_N[q]]$, denotes the N×1 transmit signal vector that collects the symbols $x_m[q]$, m∈1, . . . N and v[q] is the N×1 column noise vector experienced at the receiver, which includes thermal noise, alien noise, and so on. Note that the system model above is true irrespective of whether the system is transmitting in the upstream (US) direction or the downstream (DS) direction.

FEXT cancellation is performed on a given tone by applying an N×N matrix either at the received symbol vector (for US FEXT cancellation) or for precompenstation at the downstream transmit symbol vector in a CO-centric self-FEXT cancellation scheme. This implies that on average, removal of crosstalk from one disturber to a victim involves a unit multiplication complexity. Removing the crosstalk induced on disturber n to victim m on tone q is equivalent to H (n,m)[q]=

0. Consequently, full cancellation of FEXT implies that all the non-diagonal terms of channel matrix are equivalently made zero, as reflected below:

$$H(n,m)[q]=0, n \neq m \; q \in 1, \ldots K \quad (2)$$

Thus, performing partial cancellation implies partial nulling of the coupling coefficients. In other words, efficient partial cancellation involves determining which disturber to cancel for which tone so as to maximize a certain rate criterion.

The single-user weighted rate optimization framework is now defined for partial FEXT cancellation. In accordance with various embodiments, one aspect involves maximizing the weighted rate of the vectored users after undergoing partial cancellation given: 1) the total computational computational resources available as well as 2) the individual minimum rate requirements (represented by $R_n^{tar}$, $n \in \{1, \ldots N\}$) of the vectored users. Assume that the total complexity (or cancellation taps) available is represented by $C^{tot}$. Let K matrices $\Omega[q]$ of dimension (N−1×N−1) with entries either 0 or 1 correspond to all the tones. The multi-user weighted rate optimization problem may be represented by the following:

$$R_T = \max \sum_{n=1}^{N} w_n R_n \quad \text{s.t} \quad (3)$$

$$R_n \geq R_n^{tar} \; n \in 1, \ldots, N$$

$$\sum_{n=1}^{n=N} \sum_{m=1, m \neq n}^{m=N} \sum_{q=1}^{q=K} \Omega_{n,m}[q] \leq C^{tot} \quad (4)$$

$$\Omega_{n,m}[q] = \{0, 1\} \quad (5)$$

$$\sum_{n=1}^{n=N} w_n = 1 \quad (6)$$

In the expression above, $R_n$ denotes the shannon capacity corresponding to the $n^{th}$ CPE, or user. The parameter $w_n$ represents the weight assigned for the $n^{th}$ CPE based on both a priority option as well as data rate demand considerations for that $n^{th}$ CPE.

When the crosstalk originating from disturber m into victim n at tone q is cancelled, $\Omega_{n,m}[q]=1$, otherwise $\Omega_{n,m}[q]=0$. Note that various constraints are considered. The first set of constraints specify the minimum target data rate for each of the N users. The second constraint describes the distribution of the computational resources that are available. The total rate for the nth user $R_n$ is given by:

$$R_n = \sum_{q=1}^{K} \log(1 + SNR_q^n) \quad (7)$$

Here, the term SNR is the SNR at tone and is given by:

$$SNR_q^n = \frac{|H_{n,n}[q]|^2 \sigma_x^2}{\sigma_v^2 + \sum_{m=1, m \neq n}^{m=N} |H_{n,m}[q]|^2 \sigma_x^2} \quad (8)$$

where, $\sigma_x^2$ denotes the average transmit symbol energy of the vectored users, and $\sigma_v^2$ is the variance of the additive noise at the receiver. Note that $\sigma_x^2$ and $\sigma_v^2$ are assumed to be same for all the tones. $H_{n,n}[q]$ is the direct channel response for the n'th user at tone q. Based on this, the equation above can be written as:

$$SNR_q^n = \frac{\sigma_x^2}{|H_{n,n}[q]|^{-2} \sigma_v^2 + \sum_{m=1, m \neq n}^{m=N} |H_{n,n}[q]|^{-2} |H_{n,m}[q]|^2 \sigma_x^2} \quad (9)$$

$$= \frac{\sigma_x^2}{\sigma_w^2[q] + \sum_{m=1, m \neq n}^{m=N} |c_{n,m}[q]|^2 \sigma_x^2}$$

Here, $c_{n,m}[q]$ denotes the normalized coupling between victim n and disturber m at tone q and $\sigma_w^2[q]$ is the normalized additive noise that is dependent on the tone index. Having described the basic framework for the single-user resource allocation problem, the single-user problem is solved. The extension of the single-user solution is then extended and applied to the multi-user scenario.

A solution for the single-user resource allocation problem for partial cancellation is now discussed. As will become evident later, the multi-user partial cancellation problem is a natural extension of the single-user scenario. Assume that the total amount of computational resources available in the system for the vectored user n is represented by the parameter $\lambda_n$. To cancel the dominant crosstalkers for user n, a K×(N−1) concatenated matrix $D_n = [c_q^1 \; c_q^2 \ldots c_q^N]^t$ is created where the $i^{th}$ row given by the $n^{th}$ row of normalized coupling matrix corresponds to tone i (i.e., $c_i^n$). In other words, matrix $D_n$ represents the row-wise concatenation of couplings from the remaining N−1 disturbers onto all the tones. Assuming that one unit resource complexity (e.g., a cancellation tap) is needed for each disturber per tone, the coupling matrix after undergoing $\lambda_n$ crosstalk cancellations would be equivalent to inserting $\lambda_n$ zeros into matrix $D_n$. Let $C_{\lambda_n}^n$ be the corresponding matrix. If $R_n'$ is the post-partial-self-FEXT cancellation rate for the user n, then the partial cancellation problem statement is represented by the following:

$$\underset{C_{\lambda_n}^n}{\arg\max} R_n' \quad (10)$$

Thus, the single-user resource allocation problem represented above is directed to searching across all possible matrices $C_{\lambda_n}^n$ that is generated by inserting $\lambda_n$ zeros into $D_n$.

The cancellation taps are allocated using dynamic programming so as to achieve a maximum rate gain in each step. Two observations should be noted. First, the most dominant crosstalk source for a particular tone (corresponding to any row of the matrix $D_n$) is the source with the largest coupling value. Therefore, this disturber source should be cancelled first. Also, cancelling a disturber on one tone has no impact on the rate gained in the other tone. Various embodiments for complexity resource allocation are based on the two observations above. Specifically, the overall coupling matrix $D_n$ comprising couplings from all the tones is re-arranged in a fashion that levarages the observations above. Based on these observations, a search method relating to which disturber to cancel for which tone is derived to provide an efficient means for performing partial FEXT cancellation. To leverage the first observation above, the magnitude square of $D_n$ is calculated to obtain $\tilde{D}_n$, and each row (corresponding to each tone) is sorted in ascending order with respect to their magnitudes. Next, the cumulative sums are calculated in each row of the matrix $\tilde{D}_n$. Note that the jth element of any row of $\tilde{D}_n$ given by $\Sigma_{k=1}^{k=j}|c_q^k|^2$ signifies the norm of the coupling post cancellation of the first N−j disturbers in the respective row (tone). The rate at tone q after the cancellation of N−j dominant disturbers is then obtained. The resulting matrix obtained after performing the operation above is represented by L. Now consider any row of the above matrix L. The difference between the two consecutive elements of any row (for example, L(q,j)−L (q,j−1)) represents the rate gained by cancelling the j'th dominant disturber at the q'th tone. A matrix ΔL is constructed where its elements ΔL(q, j−1) is defined by L(q,j)−L(q,j−1), j∈{1, . . . N}. The second observation above is leveraged.

To now illustrate the number of computational resources needed to perform the process outlined above, the number of computational iterations are shown below by the corresponding sets of operations:

Operation 0:
The matrix $\tilde{D}$ is computed where $d_{ii}$ represents the squared magnitude of the normalized couplings $d_{ii}$.

Operation 1:
This operation comprises sorting each row in the matrix $\tilde{D}$ Operation 2:
The cumulative sum of each row is computed, as shown below:

$$\begin{bmatrix} \tilde{d}_{11}^2 & \tilde{d}_{11}^2 + \tilde{d}_{12}^2 & \cdots & \sum_{j=1}^{N} \tilde{d}_{1j}^2 \\ \tilde{d}_{21}^2 & \tilde{d}_{21}^2 + \tilde{d}_{22}^2 & \cdots & \sum_{j=1}^{N} \tilde{d}_{2j}^2 \\ \vdots & \vdots & \ddots & \vdots \\ \tilde{d}_{K1}^2 & \tilde{d}_{K1}^2 + \tilde{d}_{K2}^2 & \cdots & \sum_{j=1}^{N} \tilde{d}_{Kj}^2 \end{bmatrix} \quad (11)$$

This operation involves NK real additions.

Operation 3:
This operation is directed to performing an element-wise log operation of the matrix obtained in Operation 2 above. The term log $\tilde{d}_{ij}$ is denoted by $\tilde{l}_{ij}$. This operation involves NK logarithmic computations.

Operation 4:
This operation is directed to performing a cumulative subtraction operation to estimate the difference in the rate function, as shown below:

$$\Delta L := \begin{bmatrix} l_{11} & l_{12} - l_{11} & \cdots & l_{1N} - \sum_{j=1}^{N-1} l_{1j} \\ l_{21} & l_{22} - l_{21} & \cdots & l_{2N} - \sum_{j=1}^{N-1} l_{2j} \\ \vdots & \vdots & \ddots & \vdots \\ l_{K1} & l_{K2} - l_{K1} & \cdots & l_{KN} - \sum_{j=1}^{N-1} l_{Nj} \end{bmatrix} \quad (12)$$

$$= \begin{bmatrix} \Delta l_{11} & \Delta l_{12} & \cdots & \Delta l_{1N} \\ \Delta l_{21} & \Delta l_{22} & \cdots & \Delta l_{2N} \\ \vdots & \vdots & \ddots & \vdots \\ \Delta l_{K1} & \Delta l_{K2} & \cdots & \Delta l_{KN} \end{bmatrix} \quad (13)$$

The first part is the initialization and ordering operations (Operations 0 to 4).

To further illustrate the concept of dynamic programming, consider the following illustration involving the optimal allocation of balls to buckets. For the illustration below, suppose that there are K buckets (representing K tones), where each bucket can be filled with up to N−1 balls (each ball denoting a unit of computational resource). Let the gain increase from placing i balls in the $k^{th}$ bucket be represented by $\Delta l_{k,N-1}^n$, i∈[1,N−1]. The allocation problem focuses on placing λ balls in those buckets in such a way as to maximize the overall gain.

Let the optimal gain and corresponding updated gain matrix after p allocations be $\Delta R_n(p)=(R_n^p - R_n)$ and $\Delta L_n(p)$ (the $k^{th}$ row of matrix $\Delta L_n(p)$ has $p_k$ zeros, which corresponds to allocated balls, such that $\Delta l_{k,j}^n=0$, $1 \le j \le p_k$ and $\Sigma_1^K p_k = p$). Based on this, the recursion in the equation below involves selecting one bucket from $\{1, \ldots, K\}$ and the number of balls i∈[1,N−1] to be put the selected bucket such that $\Delta R_n(p+1)$ is maximized.

$$\Delta R_n(p+1) = \max_i \left\{ \Delta R_n(p-i+1) + \max_{k \in [1,K]} \Delta l_{k,N-i}^n(p) \right\} \quad (14)$$

As the maximum number of balls that can be put in a bucket is N−1, only N−1 steps are taken at every stage. To solve the problem in Equation 14 above, the sorted matrix $\Delta L_n^s(p)$ is accessed to identify the set of gains $\{\max_k \Delta l_{k,N-1}^n(p): 1 \le i < N\}$. These gains are then added to $\Delta R_n(p-i+1)$ obtained earlier, and the combination with the maximum sum is chosen. The gain matrix $\Delta L_n(p)$ is then updated by performing a right-shift operation on the row corresponding to the chosen bucket by i places (corresponding to the allocations in that row), and i zeros are filled in the first i columns. Moreover, $L_n(p)$ is also resubstituted with the entries which are replaced by new allocations. The sorted matrix $\Delta L_n^s(p)$ is then rearranged to obtain $\Delta L_n^s(p+1)$.

The solution above is just one way of using the dynamic programming approach, in which an optimization problem is solved by dividing the problem into many smaller problems. The optimal substructure property of the problem is exploited in the dynamic programming approach. One other embodiment of using a dynamic programming approach comprises searching one tone at a time for a unit resource (rather than one resource at a time over all the tones). There can be several other ways of breaking the problem into smaller discrete subproblems for multi-user resource allocation.

The multi-user resource allocation algorithm is now described, which is a simple extension of the corresponding single-user problem. The multi-user resource allocation is equivalent to a single-user resource allocation with NK tones and modified couplings. In this regard, the single-user resource allocation procedure presented above can be extended by concatenating the total coupling matrix $D_n$, n∈1, . . . , N of dimension K×(N−1) of all users to construct an extended coupling matrix D' whose dimension is NK×(N−1). The algorithm for the multi-user complexity resource allocation comprises the following. The N single-user resource allocation problems are solved using the technique described earlier such that the constraints are satisfied:

For (n = 1:N)

$$\arg\min_{C_{\lambda_n}^n} \lambda_n$$

s.t. $R_n = R_n^{tar}$
$C^{tot} = C^{tot} - \lambda_n$
end

Next, the remaining uncancelled couplings $C_{\lambda_N}^n$ are cancelled in order to solve the single-user resource allocation problem again.

$$\tilde{D} := \begin{bmatrix} w_1 C_{\lambda_1}^1 \\ w_2 C_{\lambda_2}^2 \\ \vdots \\ w_N C_{\lambda_N}^N \end{bmatrix} \quad (15)$$

Figure 4:
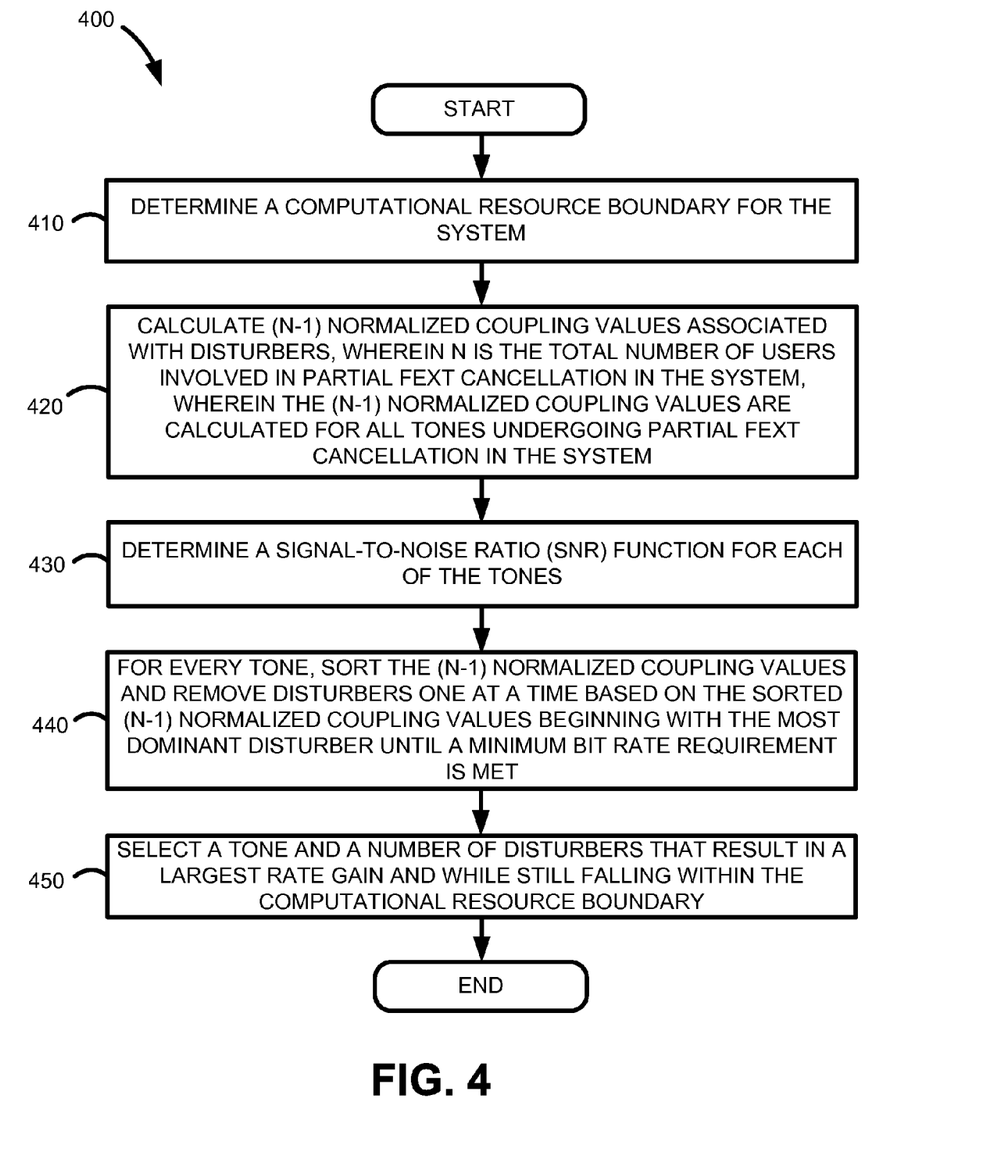
FIG. 4 is a flowchart for performing partial FEXT cancellation implemented using the components shown in FIG. 2.

Reference is now made to FIG. 4, which is a flowchart 400 for performing partial FEXT cancellation implemented in the components in FIG. 2. If embodied in software, each block depicted in FIG. 4 represents a module, segment, or portion of code that comprises program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system such as a processor in a computer system or other system such as the one shown in FIG. 2. The machine code may be converted from the source code, etc. If embodied in hardware, each block may represent a circuit or a number of interconnected circuits to implement the specified logical function(s).

Although the flowchart 400 of FIG. 4 shows a specific order of execution, it is understood that the order of execution may differ from that which is depicted. Beginning with block 410, a computational resource boundary for the system is determined. In block 420, (N−1) normalized coupling values associated with disturbers are calculated, where N is the total number of users in the system involved in partial FEXT cancellation and where the (N−1) normalized coupling values are calculated for all tones undergoing partial FEXT cancellation in the system. In block 430, a signal-to-noise ratio (SNR) function is determined for each of the tones. In block 440, for every tone, the (N−1) normalized coupling values are sorted and disturbers are removed one at a time based on the sorted (N−1) normalized coupling values beginning with the most dominant disturber until a minimum bit rate requirement is met. In block 450, a tone and a number of disturbers are selected that result in a largest rate gain and while still falling within the computational resource boundary.

Figure 5:
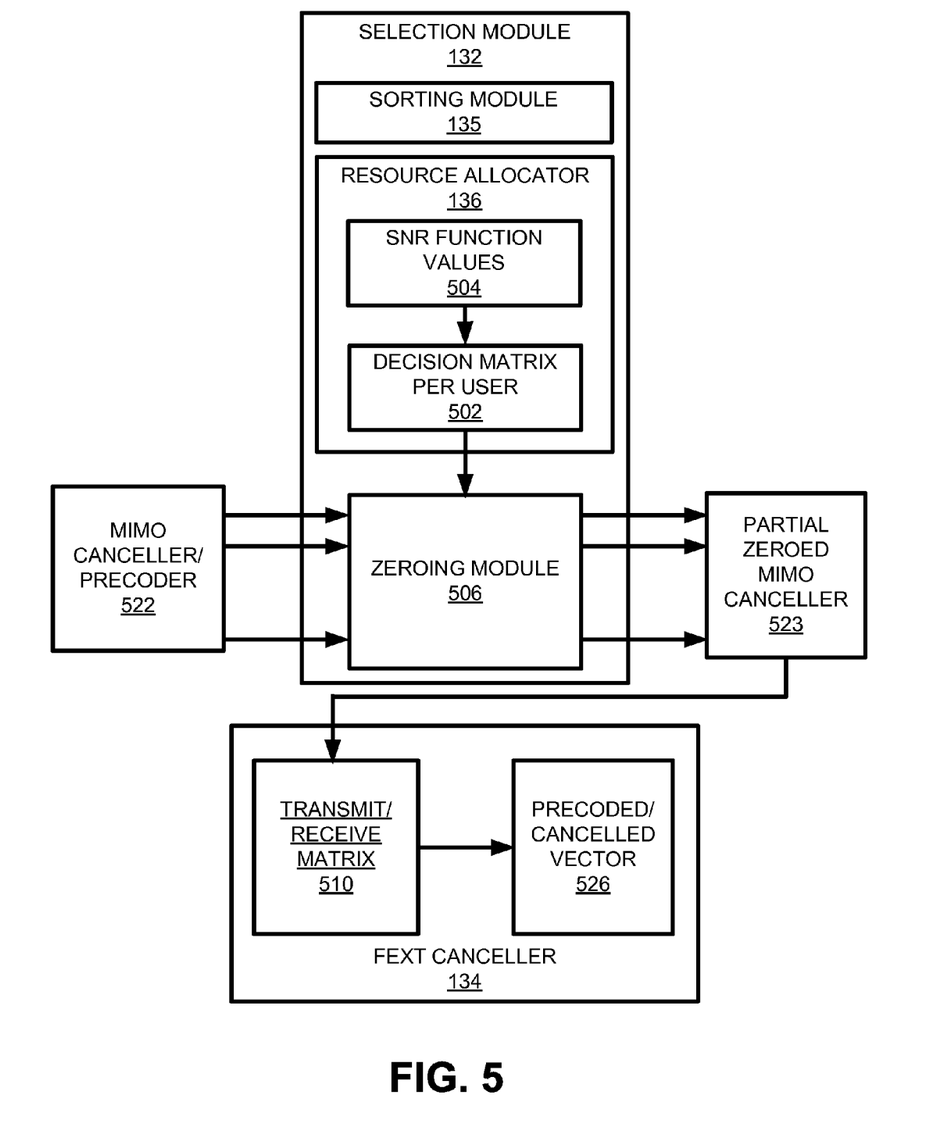
FIG. 5 illustrates the signal flow between the selection module and FEXT canceller shown in the system of FIG. 1 for performing partial FEXT cancellation.

FIG. 5 illustrates the signal flow between the selection module 132 and FEXT canceller shown 134 in the system 100 of FIG. 1 for performing partial FEXT cancellation. Specifically, FIG. 5 illustrates partial FEXT cancellation for a given victim vectored user based on resource allocation, as described herein for various embodiments. Note that the partial FEXT cancellation scheme depicted in FIG. 5 may be implemented for both the upstream (US) and downstream (DS) directions. As described earlier, the selection module 132 comprises a sorting module 135 configured to sort, for each of the tones present, (N−1) normalized disturber coupling values in descending order with respect to magnitude of the normalized disturber coupling values. As shown, the MIMO precoder or canceller 522, representing the matrix coefficients for the precoder or canceller for full cancellation of all disturbers into each of the tone of the victim user (i.e., either precoder for the DS direction or canceller for the US direction), is passed through a zeroing module 506 in the selection module 132, where the zeroing module 506 is configured to zero out the coefficients of the full MIMO precoder or canceller corresponding to indices of those disturbers which are not to be cancelled for each of the tone of the victim user. This is done according to the resource allocation performed by the selection module 132.

As described earlier in connection with FIG. 1, the selection module 132 comprises a resource allocator 136. The resource allocator 136 provides an input to the zeroing module 506. Specifically, a per tone decision matrix 502 derived based on SNR function values 504 is fed into the zeroing module 506. However, it should be emphasized that while FIG. 5 depicts the use of SNR function values 504, other function values may be used as well, including, but not limited to a rate difference function of various vectored users along with the associated weight vector. Based on the per tone decision matrix 502, the zeroing module 506 determines a partial precoder or canceller 523. In the FEXT canceller 134, a row of the precoder or canceller 523 is multiplied to the corresponding column of the matrix of the transmit or received vectors, whereby a precoded/cancelled vector 526 is produced. Each row of the partial zeroed MIMO canceller 523 and corresponding column of the transmit/receive matrix 510 correspond to a tone.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

The invention claimed is:

1. A method implemented in a multi-user discrete multi-tone (DMT) communication system for performing far-end crosstalk (FEXT) cancellation for each victim user, comprising:

for each victim user among all victim users, calculating (N−1) normalized disturber coupling values across all tones in the system to undergo partial FEXT cancellation, wherein N is a total number of users involved in partial FEXT cancellation, and wherein the disturber coupling values represent signal energy from the (N−1) disturbers that couple onto the victim;

for each tone in the DMT communication system, sorting the (N−1) normalized disturber coupling values;

calculating (N−1) rate difference function values for every tone, wherein the rate difference function values represent an incremental rate gained by cancelling the (N−1) disturbers;

based on the sorted (N−1) normalized disturber coupling values and difference rate function values, performing resource allocation according to a dynamic programming approach, wherein the dynamic programming approach comprises recursively, by a plurality of steps, of selecting for performing FEXT cancellation using a total amount of resources one or more of: a disturber and a tone; and performing partial FEXT cancellation on signals for all victim users in the DMT communication system on only the disturbers and tones selected according to the dynamic programming approach, wherein a number of one or both of the selected disturbers and tones is less than the total number of disturbers and tones in the DMT communication system.

2. The method of claim 1, wherein performing resource allocation comprises selecting a tone among all the tones and a number of disturbers associated with the selected tone.

3. The method of claim 2, wherein tone selection and disturber selection is performed until a predetermined level of computing resources in the multi-user communication system is exhausted for FEXT cancellation on the selected tones and disturbers.

4. The method of claim 2, wherein tone selection and disturber selection is performed until a minimum bit rate requirement is met for each victim user.

5. The method of claim 1, wherein each of the plurality of steps in the dynamic programming approach includes selecting the one or more of the disturber and tone independently for only one victim user in the multi-user communication system.

6. The method of claim 1, wherein the sorted N−1 normalized disturber coupling values are concatenated for all the victim users in the system and weighted rate difference function values are calculated for each of the victim users,
wherein the weighted rate difference function values are calculated according to weights assigned to each of the victim users, and
wherein allocating resources according to the dynamic programming approach is performed on the concatenated (N−1) normalized disturber coupling values and the weighted rate difference function values.

7. The method of claim 6, further comprising dynamically adjusting the weights associated with each victim user to maximize a number of vectored users according to different services.

8. A system for performing far-end crosstalk (FEXT) cancellation, comprising:
means for sorting (N−1) normalized disturber coupling values and means for calculating (N−1) difference rate function values associated with N total users in the system involved in partial FEXT cancellation, wherein the disturber coupling values represent signal energy from the (N−1) disturbers that couple onto the victim, and wherein the rate difference function values represent an incremental rate gained by cancelling the (N−1) disturbers; and
means for performing dynamic programming to incrementally, by a plurality of steps, allocate resources for performing FEXT cancellation using a total amount of resources, wherein during each of the plurality of steps, the means for performing dynamic programming selects one or more of: a disturber and a tone, and wherein partial FEXT cancellation is performed on signals for all victim users in the communication system on only the disturbers and tones selected by the means for performing dynamic programming, wherein a number of one or both of the selected disturbers and tones is less than the total number of disturbers and tones in the communication system,
wherein one or more of the means for sorting, means for calculating and means for performing are implemented by a computer processor.

9. The system of claim 8, wherein the selection module further includes means for selecting a tone among all the tones and a number of disturbers associated with the selected tone.

10. The system of claim 9, wherein the selection module performs tone selection and disturber selection until a predetermined level of computing resources in the communication system is exhausted for FEXT cancellation on the selected tones and disturbers.

11. The system of claim 9, wherein the selection module performs tone selection and disturber selection until a minimum bit rate requirement is met for each victim user.

12. The system of claim 8, wherein each of the plurality of steps performed by the means for performing dynamic programming includes selecting the one or more of the disturber and tone independently for only one of the victim users in the system.

13. The system of claim 8, wherein the selection module further comprises a means for sorting and concatenating the (N−1) normalized disturber coupling values, the selecting module further including means for calculating weighted rate difference function values for each of the victim users, wherein the means for performing dynamic programming performs dynamic programming based on the concatenated (N−1) normalized disturber coupling values and the weighted rate difference function values.

14. The system of claim 13, wherein the selecting module further includes means for dynamically adjusting the weights associated with rate difference function values to maximize a number of vectored users according to different service categories.

15. A method implemented by a computer processor in a multi-user discrete multi-tone (DMT) communication system for performing far-end crosstalk (FEXT) cancellation for victim users, comprising:
performing dynamic programming by the computer processor to allocate resources according to (N−1) normalized disturber coupling values and (N−1) difference rate function values associated with N total users in the system involved in partial FEXT cancellation, wherein the disturber coupling values represent signal energy from the (N−1) disturbers that couple onto the victim, and wherein the rate difference function values represent an incremental rate gained by cancelling the (N−1) disturbers,
wherein dynamic programming comprises selecting for performing FEXT cancellation using a total amount of resources, in each of a plurality of steps, one or both of a tone among all tones in the DMT communication system and one or more disturbers to be cancelled for the tone; and
performing partial FEXT cancellation on signals for all victim users in the DMT communication system on only the disturbers and tones selected according to the dynamic programming approach, wherein a number of one or both of the selected disturbers and tones is less than the total number of disturbers and tones in the DMT communication system.

16. The method of claim 15, wherein dynamic programming is performed recursively until a total number of resources in the system are exhausted.

17. The method of claim 15, wherein each of the steps in the dynamic programming approach is performed independently for each victim user in the system.

18. The method of claim 15, further comprising:
for each victim user, calculating the (N−1) normalized disturber coupling values across all tones;
for each tone in the DMT communication system, sorting the (N−1) normalized disturber coupling values; and
for each of the victim users calculating (N−1) rate difference function values for every tone in the DMT communication system.

19. The method of claim 18, wherein the sorted N−1 normalized disturber coupling values are concatenated for up to all the victim users in the system and weighted rate difference function values are calculated for up to all the victim users,
wherein the weighted rate difference function values are calculated according to weights associated with each of the victim users, and
wherein allocating resources according to the dynamic programming approach is performed on the concatenated (N−1) normalized disturber coupling values and the weighted rate difference function values.

20. The method of claim 19, further comprising dynamically adjusting the weights associated with each victim user to maximize a number of vectored users according to different services.

* * * * *

UNITED STATES PATENT AND TRADEMARK OFFICE
CERTIFICATE OF CORRECTION

PATENT NO. : 9,042,211 B2  Page 1 of 1
APPLICATION NO. : 12/969332
DATED : May 26, 2015
INVENTOR(S) : Biyani et al.

It is certified that error appears in the above-identified patent and that said Letters Patent is hereby corrected as shown below:

In the specification,

In Column 12, Line 53, delete "$x_N[q]],$" and insert -- $x_N[q]]_t$ --, therefor.

In Column 13, Line 57, delete "SNR" and insert -- $SNR_q^n$ --, therefor. (first occurrence)

In Column 15, Line 43, delete "$\tilde{I}_{ij}.$" and insert -- $l_{ij}.$ --, therefor.

In Column 16, Line 7, delete "$\Delta l_{k,N-1}$"," and insert -- $\Delta l_{k,N-i}$", --, therefor.

In Column 16, Line 26, delete "{maxkΔlk,N-1n(p):" and insert -- {maxkΔlk,N-in(p): --, therefor.

Signed and Sealed this
Twentieth Day of October, 2015

Michelle K. Lee
*Director of the United States Patent and Trademark Office*